(12) United States Patent
Stamper et al.

(10) Patent No.: US 6,820,265 B1
(45) Date of Patent: Nov. 16, 2004

(54) SYSTEM METHOD AND DATA STORAGE MEDIUM FOR SHARING DATA BETWEEN VIDEO GAMES

(75) Inventors: Timothy David Joseph Stamper, Ravenstone (GB); Paul John Machacek, Swadlincote (GB)

(73) Assignee: Rare Limited, Twycross (GB)

( * ) Notice: Subject to any disclaimer, the term of this patent is extended or adjusted under 35 U.S.C. 154(b) by 0 days.

(21) Appl. No.: 09/340,713

(22) Filed: Jun. 29, 1999

(51) Int. Cl.⁷ .............................................. G06F 9/46
(52) U.S. Cl. ..................... 719/312; 463/43; 463/44; 463/45; 463/46; 463/47; 711/147; 711/148
(58) Field of Search ................................. 463/7, 43, 44

(56) References Cited

U.S. PATENT DOCUMENTS

| | | | |
|---|---|---|---|
| 4,799,145 A | * 1/1989 | Goss et al. ..................... 713/1 |
| 5,054,787 A | 10/1991 | Richardson |
| 5,083,271 A | 1/1992 | Thacher et al. |
| 5,408,408 A | 4/1995 | Marsico, Jr. |
| 5,408,617 A | * 4/1995 | Yoshida ....................... 719/319 |
| 5,530,302 A | 6/1996 | Hamre et al. |
| 5,572,685 A | 11/1996 | Fisher et al. |
| 5,579,491 A | 11/1996 | Jeffries et al. |
| 5,604,887 A | * 2/1997 | Naidu et al. .................. 703/27 |
| 5,640,545 A | 6/1997 | Baden et al. |
| 5,664,119 A | 9/1997 | Jeffries et al. |
| 5,675,750 A | 10/1997 | Matsumoto et al. |
| 5,709,603 A | 1/1998 | Kaye |
| 6,042,478 A | * 3/2000 | Ng ............................. 463/44 |
| 6,296,567 B1 | * 10/2001 | Kudo ............................ 463/7 |
| 6,334,815 B2 | * 1/2002 | Miyamoto et al. ........... 463/43 |

\* cited by examiner

*Primary Examiner*—St. John Courtenay, III
*Assistant Examiner*—Charles E. Anya
(74) *Attorney, Agent, or Firm*—Christensen O'Connor Johnson Kindness PLLC (57) ABSTRACT

A system for sharing information between separately executable programs is provided. The data sharing system includes a control unit (11) having a processor (12) and a memory (16) coupled to the processor (12). The memory (16) stores information pertaining to a first program that was previously executed by the processor (12). The data sharing system also includes a data storage medium (14) that stores a second program executable by the processor (12). When executed by the processor, the second program retrieves information pertaining to the first program from the memory and utilizes the information pertaining to the first program with the execution of the second program.

9 Claims, 5 Drawing Sheets

SYSTEM METHOD AND DATA STORAGE MEDIUM FOR SHARING DATA BETWEEN VIDEO GAMES

FIELD OF THE INVENTION

The present invention relates to a system and method for sharing data between software programs in general, and in particular, but not exclusively, to a system and method for sharing data between video game programs.

BACKGROUND OF THE INVENTION

Video games are popularly played on systems which are functionally devoted to that use. Such a system includes a console connected to a video monitor or television set. The console houses a processor and has a slot for receiving a cartridge containing program information for a particular game to be played. One or more controllers, which may be hand-held, are connected to the console, and each controller has a joystick, buttons or other user interface thereon. Signals from the controller or controllers are transmitted to the console and thus enable the player of a game to interact with the console.

Generally, a cartridge comprises Read Only Memory which contains a game program. The console acts under the control of the game program to process signals received from the controller and to provide video and audio signals to be sent to the monitor or television set.

The content of video games can be quite vast. Some video game programs require the player to traverse a maze while others require the player to find hidden objects to, for example, fight against evil or help save a princess. Once the player reaches the end of the game or feels he has sufficiently completed the game, the player often loses interest in the game. In response, manufacturers often create multiple versions of a popular game offering, for example, new quests for the character of that game. However, even though the general essence of the game is retained in subsequent versions, the original game remains essentially useless to the player. Furthermore, each of the subsequent games in the sequence is separate and distinct, providing no interaction between the games, but rather only a common theme.

Therefore, there is a need for a system that prolongs the useful life of video games, and thus video game cartridges or other storage media, by maintaining a player's interest in the game by the sharing of data between separate games.

SUMMARY OF THE INVENTION

The present invention provides a system for sharing information between software programs. The data sharing system includes a control unit having a processor and a memory that stores information pertaining to a first program that has been previously executed by the processor. The data sharing system also includes a data storage medium that is coupleable to the control unit. The data storage medium stores a second program that when coupled to and implemented by the processor of the control unit, retrieves information pertaining to the first program from the memory of the control unit and utilizes the retrieved information in the execution of the second program. As a result, information from the first program can affect the implementation of the second program. The first program is typically, but not necessarily, stored on a separate data storage medium.

In accordance with further aspects of the present invention, the second program, when implemented by the processor, confirms the validity of the retrieved information prior to utilizing it in the implementation of the second program.

In accordance with yet further aspects of the invention, the first program, identified above as having been previously executed, contains instructions that when executed by the processor specifically identifies information pertaining to the first program that is shareable with the second program and stores this information in the memory of the control unit for subsequent retrieval by the second program.

In accordance with yet other further aspects of the invention, the first program alternatively contains instructions that when executed by the processor specifically identifies information for sharing with the second program and provides a code that is associated with this identified information to a user of the first program via a display coupled to the control unit. In this instance, the code is provided instead of storing the identified information to the memory. In this regard, the second program alternatively contains instructions that when executed by the processor ask the user to provide a code, if any, and then utilize the information associated with the code in the implementation of the second program.

In accordance with yet other alternative aspects of the present invention, the control unit is a video game console, and the data storage media are first and second game cartridges storing first and second video game programs, respectively.

As will be readily appreciated from the foregoing description, the invention provides a system that supports interaction between software programs and that is ideally suited for a video game system. Because a first video game program can identify information for use by a second video game program to affect the characteristics thereof and vice versa, the complexity of the video games is increased and a video game player's interest in the games is further captivated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a system and method for sharing information between separately executable programs, and a data storage medium for, among other things, storing a program that is capable of retrieving and utilizing information provided by another program.

Figure 1:
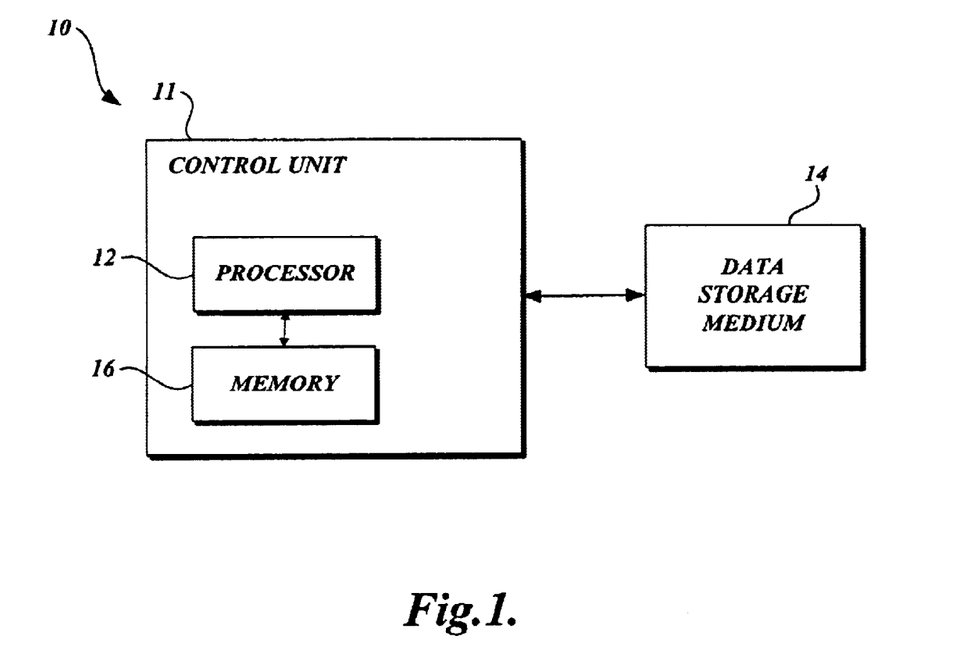
FIG. 1 is a block diagram of a system utilized for sharing data in which the present invention is implemented.

FIG. 1 is a block diagram depicting several of the key components of a system 10 for sharing data between separate programs in accordance with the present invention. The data sharing system 10 includes a control unit 11 having a processor 12 and a memory 16. The data sharing system 10 also includes at least one data storage medium 14 coupled to the processor 12. The at least one data storage medium 14 includes at least one program stored thereon for implementation by the processor 12. While the at least one data storage medium 14 can be internal to the control unit 11, it is preferably external to the control unit 11 as shown in FIG. 1.

Non-limiting examples of the at least one data storage medium 14 include cartridges, magnetic cassettes, flash memory cards, digital video disks, random access memories (RAMs), read-only memories (ROMs), and the like.

The control unit 11 and the at least one data storage medium 14 are equipped to communicate with each other in any of a number of manners, each well-known in the art. For instance, the control unit 11 includes an external interface (not shown) for establishing a connection with one or more external data sources. As an example, in one embodiment, the control unit 11 is connected to a local area network, which is in turn connected to the Internet. Accordingly, the external interface includes the necessary circuitry for such a connection. However, it will be appreciated by those skilled in the art and others that other means for establishing a communications link between the control unit 11 and an external data source, such as the at least one date storage medium 14, may be used. Non-limiting examples of the type of communication link to be established include acoustic, optical, electromagnetic radiation or physical communication links. Returning to the previous example, the external interface is also constructed for use with the Transmission Control Protocol/Internet Protocol (i.e., the standard transmission protocol for the Internet, also known as "TCP/IP"), the particular network configuration of the local area network it is connecting to, and a particular type of coupling medium. As a result, the external data source may be an Internet web site, i.e., a server connected to the Internet which has mass storage facilities. In other embodiments of the present invention, the external interface comprises a modem, and in this regard, the external data source could simply be another control unit.

Those of ordinary skill in the art will appreciate that the data sharing system 10 includes many more components than those shown in FIG. 1. However, it is not necessary that all of these generally conventional components be shown in order to disclose an illustrative embodiment for practicing the present invention.

As will be better understood from the following description, the data sharing system 10 provides for the utilization of data generated by a first program with a separate second program. The first program is stored on a first of the at least one data storage medium coupled to the processor 12. The second separately executable program can also be stored on the first data storage medium, but is preferably stored on a second of the at least one data storage medium coupled to the processor 12.

In accordance with the present invention, the processor 12 reads and executes the first program, thereby implementing the first program. In particular, the first program is typically loaded into the memory 16 before execution. Then, the processor 12 executes the instructions of the first program now stored in memory 16. Upon execution of the first program, information pertaining to the first program or the implementation thereof, such as the occurrence of a particular event, is typically stored, as is well-known in the art, in the memory 16 or in another memory coupled to the processor 12. This practice is typical in the implementation of most software programs.

Figure 2:
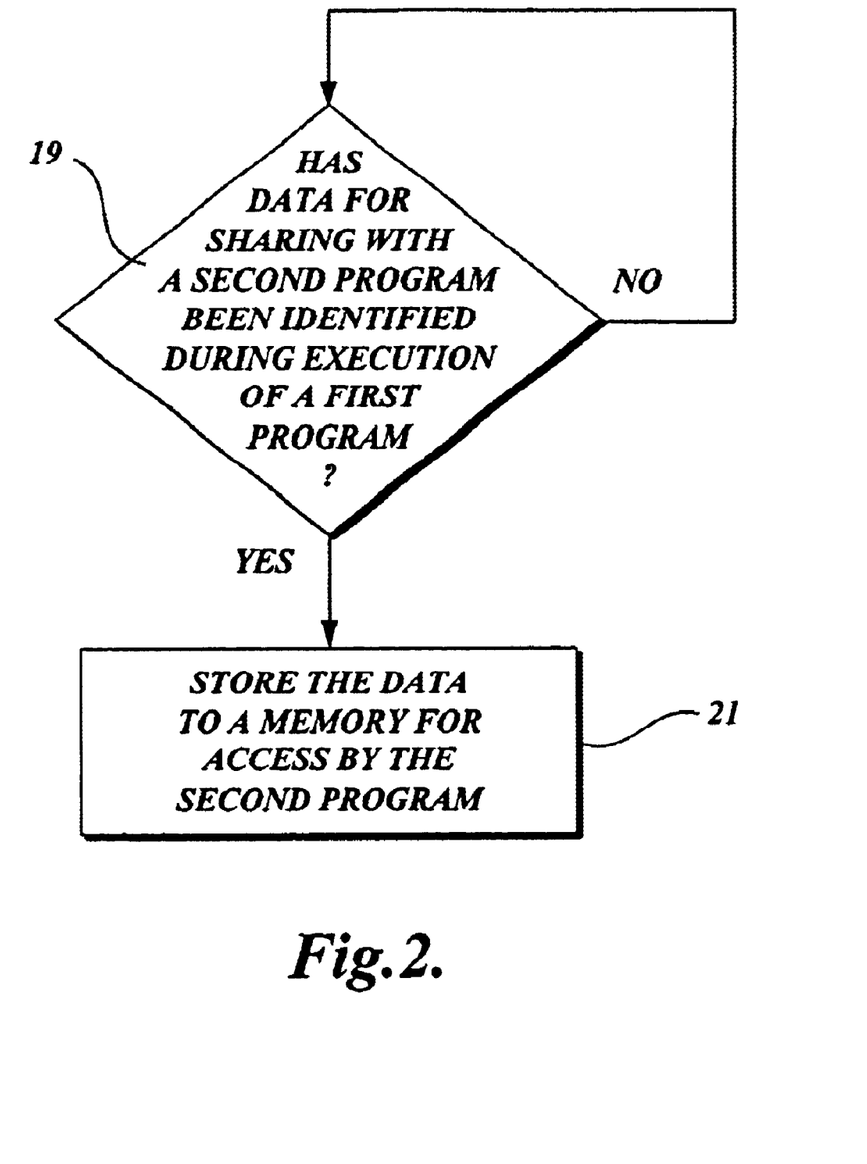
FIG. 2 is a flow diagram illustrating the logic of a first program for identifying information for sharing with a second program and for storing this data in a memory accessible by the second program in accordance with this invention.

Alternatively, the first program includes logic for, among other things, specifically identifying certain data or portions of the first program that, once executed, are capable of sharing information with other separate programs and requesting storage of such information. FIG. 2 is a flow diagram illustrating the logic of this alternative first program implemented by the processor 12.

Beginning at a step 19, a test is made to determine whether information has been identified that is shareable with another program. Shareable information may, for example, be identified or triggered upon the occurrence of a certain event, e.g., reaching a certain level of a game or completing the game. The content of the information identified as "shareable" with other programs can vary, as will be described in further detail below. As a non-limiting example, the information provided may be a reward, such as a new weapon, for completing a particular level of a video game. Or, it may simply be a flag to signal to another program whether a particular condition has or has not been met. In this regard, the first program may invoke the storage of one or any number of flags or other information in the memory 16.

If information for sharing with another program has not been identified or if a particular trigger event has not yet occurred, the second video game program continues to make a query for such information, as shown in FIG. 2. On the other hand, if shareable information is identified, the shareable information is stored in memory 16 or some other identified memory that is universally accessible by other programs at a step 21.

As previously mentioned, the information stored by the first program, either as a result of the mere execution of a typical first program as well-known in the art or as specifically identified as shareable by the first program illustrated in FIG. 2, can drastically vary. As a first example, this information may include a "flag" for identifying the occurrence of an event. A flag is typically a yes/no indicator, but can also indicate two or more possible states. Alternatively, the information may include other small amounts of data apart from "flags." For example, if the program is a video game program, the information could include numeric data such as the number of lives a game player has accumulated or the skill level a player has achieved in a previous game. Even further, the information could include larger blocks of data for adding an entirely new feature to another program, such as an entire textured model of a character for a video game, various text statements, standard sound effect samples, and a table of attributes that govern that character's features and abilities.

Figure 3:
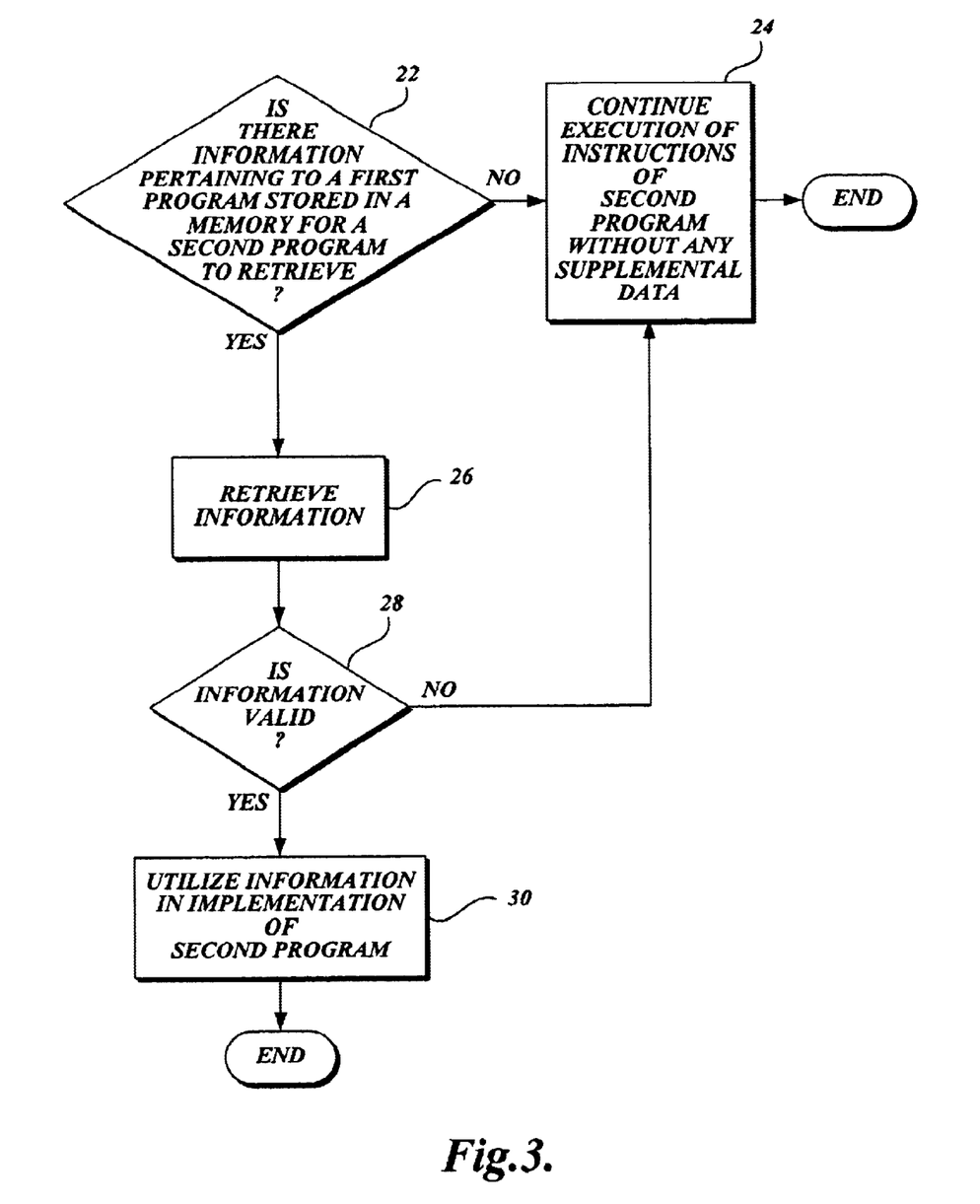
FIG. 3 is a flow diagram illustrating the logic of a second program for retrieving information previously stored by the first program and utilizing the information in conjunction with the second program in accordance with the present invention.

After execution of the first program, the processor 12 and the memory 16 are used to execute the second program. The second program includes logic for, among other things, retrieving information previously stored by the first program on a memory coupled to the processor 12 and utilizing at least a portion of this information in the implementation of the second program. FIG. 3 is a flow diagram illustrating the logic of the second program as implemented by the processor 12.

Beginning at a step 22, a test is made to determine whether there is any information, previously stored by a first video game program, in the memory 16 or some other universally accessible location for retrieval by the second program. If the answer to step 22 is no, then the execution of the second program continues at a step 24 without any supplemental data. If the answer to step 22 is yes, the identified information is retrieved by the processor 12 at a step 26.

Upon retrieval of the identified information, another test is made to determine the validity of the retrieved information at a step 28. Primarily, the second program is checking to specifically determine that the data is of the correct type; that it is whole and complete within itself; that there is no corruption in whole or in part; and that the data is suitable for use by and is acceptable to the second program. This validity test can be accomplished by conventional error checking techniques which could, for example, include checking data. Even further, extra data can be incorporated alongside or within the data to be transferred. This extra data can be calculated by a program from the data to be transferred. In this regard, the calculation method used could be a simple addition of all of the data, or it could be a more complicated algorithm which generates what is conventionally understood to be an error checking code like a checksum. When the second program retrieves this data it can perform an algorithm to calculate a value which it could in some way compare with the checksum value stored with the data. If the comparison is confirmed, then the data is deemed valid. It will also be appreciated by those skilled in the art and others that more than one checksum may be needed to confirm the validity, integrity and acceptability of the data.

If the retrieved information is not valid, processing returns to step 24 as shown in FIG. 3 and the second program is implemented without any supplemental data. On the other hand, if the retrieved information is valid, some or all of this information is utilized, as needed, by the processor 12 in the implementation of the remaining instructions of the second program, thereby allowing characteristics from the first program to affect those of the second program. See step 30. Obviously, the information or program codes stored in the memory 16 from the first program must be compatible with the second program. It will also be appreciated by those skilled in the art and others that checking the validity of the data at step 28 is optional and that this step's usefulness is primarily dependent upon the type of system upon which the programs of this invention are implemented.

Preferably, the memory 16 from which the identified information is retrieved is a non-volatile random access memory (RAM) for storing information that can be readily used by the second program, particularly after the power to the processor 12 has been turned "off" for any considerable length of time. Alternatively, the memory 16 can be a typical random access memory, and in this instance, the processor 12 is preferably adapted to provide for the hot swapping of data so that programs can be loaded into and executed by the processor while it is powered on. However, information stored in the typical random access memory by a first program can still be retrieved by a second program through cold swapping, which requires that the power of the processor 12 be turned off before implementing a new program, as long as the new program is coupled to the processor and the processor is immediately turned back on. If this is done quickly enough, the information in RAM may still be retrievable. It is in this instance in which the validity checking provided at step 28 is most useful.

The second program as described in FIG. 3 may also include the logic depicted in FIG. 2 for specifically identifying shareable information for storing in the memory 16 for retrieval by the first or yet some other program. As a result, once the first or some other program, which also includes the logic depicted in FIG. 3, is executed by the processor, the processor 12 identifies, retrieves and utilizes this information in conjunction with the first or other program. In essence, the control unit 11 permits the free communication between programs stored on the same or separate data storage media. It will be appreciated by one skilled in the art and others that information may be shared as described above between any number of software programs on the same or separate data storage media.

Figure 4:
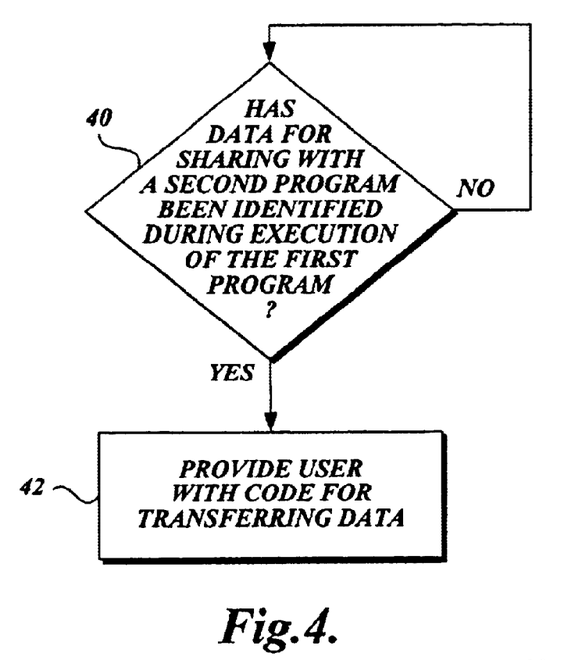
FIG. 4 is a flow diagram illustrating the logic of an alternative embodiment of the first program described in FIG. 2 for identifying data to be shared with an alternative embodiment of the second program and providing a code for transferring the data to the second program.

FIG. 4 is a flow diagram illustrating the logic of an alternative embodiment of the first program described in FIG. 2 for specifically identifying data to be shared with another program. In general, instead of storing the identified shareable information in memory 16, the processor implementing the first program generates a code associated with the shareable information and provides it to a user of the first program via a display that is coupled to the control unit 11. In particular, beginning at a step 40, a test is made to determine whether information has been identified that is shareable with another program, identical to step 19 in FIG. 2. Again, if information for sharing with another program has not been identified or if a particular trigger event has not yet occurred, the first program continues to make a query for such information. On the other hand, if shareable information is identified, the shareable information is encoded and this code, which can be an alpha/numeric code, a set of key combinations or the like, is provided to a user of the first program via a display (not shown) coupled to the control unit 11. See step 42. This code can then be utilized by the user to transfer the shareable information to another program as described below in reference to FIG. 5. Optionally, the code could be encrypted or modified in such a way that it could only be executed by a certain copy of a program or on a certain processor, so that this code is useless to anyone else. Obviously, only a limited amount of data can reasonably be transferred in this manner.

Figure 5:
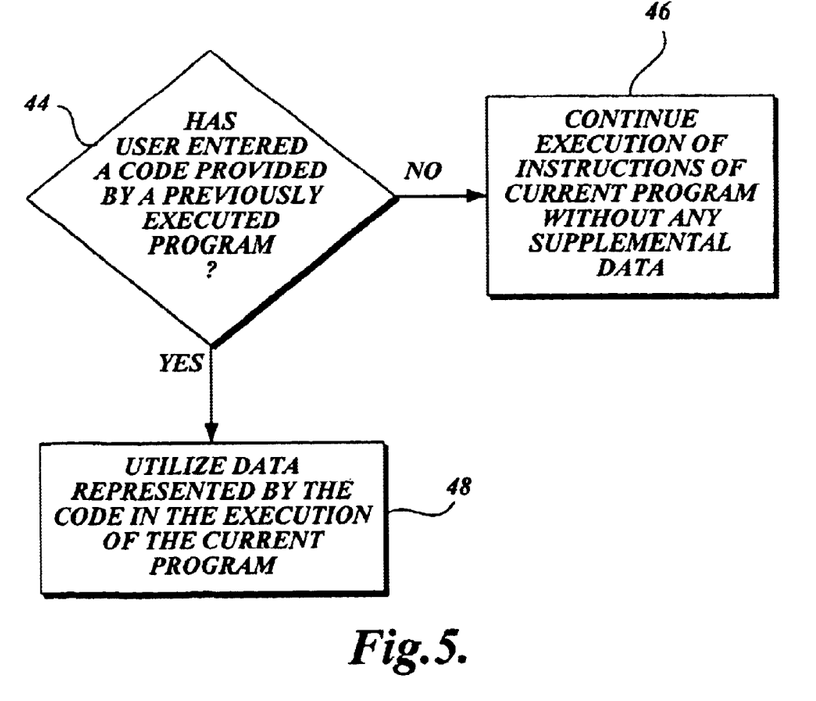
FIG. 5 is a flow diagram illustrating the logic of the alternative embodiment of the second program for receiving a code provided by the first program described in FIG. 4 and for utilizing the data represented by the code.

FIG. 5 is a flow diagram illustrating the logic of an alternative embodiment of the second program for receiving a code for transferring data from the first program illustrated in FIG. 4 to the second program for utilization therewith. Beginning at a step 44, a test is made to determine whether a user of the second program has entered a code, as defined above in reference to FIG. 4, using an input device (not shown) couple to the processor. If the user has not entered any such code, the execution of the second program continues without the use of supplemental data from another game program, as shown at a step 46. If the user has entered the code, the data represented by the code is used in the execution of the second program to allow characteristics from the first program to affect those of the second program.

It will be appreciated by those skilled in the art and others that the present invention is ideally suitable for a video game system. In this regard, the first program refers to a first video game program, while the second program refers to a second video game program. Preferably, the data storage media on which the first and second video game programs and/or other video game programs are initially stored are game cartridges having the necessary electronics for interfacing with the control unit 11. The control unit 11 is preferably a video game console which, among other things, includes at least one slot with the necessary circuitry for receiving the game cartridges. However, it will also be appreciated by those skilled in the art and others that a physical connection between the data storage medium and the system 10 is not necessary. For example, as previously indicated, the connection can be provided via an acoustic, optical or electromagnetic radiation link.

It will be further appreciated by those skilled in the art and others that the video game programs can be implemented on any type of system that has a display component to depict the video game and at least one processing component to execute the instructions of the first video game program. For example, the system can be a portable system such as a handheld unit like NINTENDO's portable GAMEBOY, a personal computer or a video game console with an attached monitor.

Figure 6:
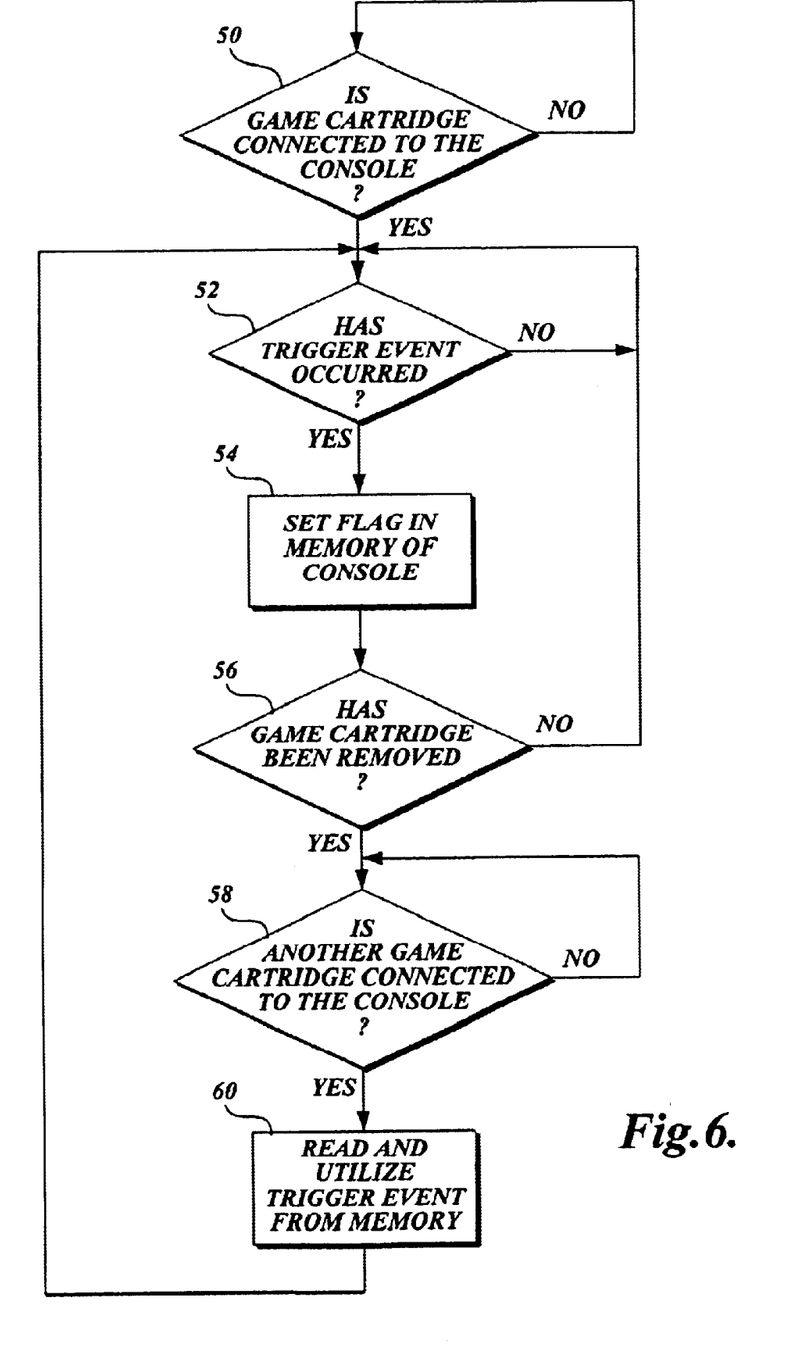
FIG. 6 is a flow diagram illustrating the steps of a method of sharing data between video game programs implemented on a particular embodiment of the system of FIG. 1 in accordance with the present invention.

FIG. 6 is a flow diagram that illustrates the steps performed by one embodiment of the present invention to provide for the sharing of information between first and second programs formed in accordance with this invention. As the present invention is ideally suitable for a video game system, the following discussion of the steps illustrated in FIG. 6 will provide a specific example of this embodiment of the invention as it applies to a video game system.

Beginning with a step 50, a test is made to determine whether a first game cartridge is connected to a video game console. If a first game cartridge is not connected, the system continues to check for one as shown in FIG. 6.

On the other hand, if a first game cartridge containing programming information for a first video game program is connected to the console, the processor 12 acts under control of the first video game program. Then, at a step 52, the video game system determines whether a trigger event has occurred indicating the existence of information for storage in a universally accessible location of the memory 16. For example, while playing the first video game, a player may reach a certain stage in the first video game where the player recognizes a common feature from a second video game (which the player has obviously played before). As an example, the player may come across a "Huge Blocked Icy Cave" in which there is a key-shaped hole. Unfortunately, the player can find no way or key to enter the Huge Blocked Icy Cave of the first video game. At the side of the Huge Blocked Icy Cave is a lever. The player pulls the lever and a "cut-cam" shows a section from the second video game stored on a second game cartridge. This cut-cam may reveal a door access to a "Big Icy Key." If the player remembered playing the second video game, the player may have seen this area that could not have been accessed at that time. In this example, the trigger event occurs when the lever is pulled.

If the system determines that a trigger event has not occurred, it continues to query for such trigger events as shown in FIG. 6. However, if the system determines that a trigger event has occurred, the processor 12 then writes information pertaining to the trigger event into its memory 20. In this regard, the processor 12 sets a flag indicating the occurrence of the event, i.e., that the door to access the Big Icy Key in the first video game has been opened, as shown at step 54.

Then, at a step 56, the system tests for whether the first game cartridge has been removed. If not, processing returns to step 52 and the steps described above are repeated. If it has been removed, the system tests for whether the second game cartridge has been connected to the console at a step 58. If no connection has been made, the system continues to make this query. If the second game cartridge is connected, the processor 12 executes the second video game program and also reads and utilizes, if applicable, any trigger events stored in the memory at a step 60. For example, once a player inserts the second data cartridge containing the second video game he remembers playing, the player can go into the area of the game that had the Big Icy Key. Once in that area, the player would see that the door had been opened and would be able to get the key. Thus, once the second game cartridge is inserted, the processor utilizes the software of the second game cartridge in addition to the flagged information from memory 20, transferred from the first game cartridge, in order to make a change which affects the playing of the second video game.

After the video game system reads and utilizes, if applicable, the flagged information stored in memory 20 at step 60, processing returns to step 52 and the steps described above are repeated, permitting the second game cartridge to store information in memory 20 for retrieval by the first or other game cartridge. Thus, in accordance with the above example, once the player retrieves the key in the second video game, the processor sets another flag in memory 20 to signal that the Big Icy Key has been recovered from the first game cartridge. If the player then removes the second game cartridge from the console and replaces it with the first game cartridge, the player will be able to return to the Huge Blocked Icy Cave with the icy keyhole and open the sealed cave with the Big Icy Key that has been recovered from the second game cartridge. Thus, the player is now able to access this new area beyond the icy cave.

As exemplified above, the data sharing system of the present invention not only provides for the sharing of information from one program with another stored on the same or a separate data storage medium, but also provides for the interaction between the programs. Although a first game program may provide hints about how to solve a problem or get through a challenging situation as in the above example, the complexity of the first game program is increased by requiring the interaction with another game program which may in turn trigger new problems or challenges to be resolved. Furthermore, the complexity of the game programs can be controlled by the hints provided in the cut-cam. In accordance with the above example, the player must recognize from the hint that the door to access the Big Icy Key is found in the second video game, and thus, this hint requires that the player recall playing the secondary video game and also have reached a certain level in the game in order to immediately make use of the hint. As a result, by providing for the interaction between video game programs, the present invention enhances a player's interest in the video games and, thus in turn, prolongs the useful playing life of the video games.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for sharing data between software programs comprising:
    (a) a control unit having a processor and a memory coupled to the processor; and (b) a first data storage medium coupleable to the processor, the first data storage medium storing a first program implementable by the processor for:
  (i) identifying information pertaining to the first program for sharing with a second program; and
  (ii) requesting storage of the information pertaining to the first program in the memory for retrieval by the second program; and
(c) a second data storage medium coupleable to the control unit, the second data storage medium storing the second program implementable by the processor for:
  (i) retrieving the information pertaining to the first program from the memory; and
  (ii) utilizing the information pertaining to the first program with the second program,
wherein the first data storage medium is a first game cartridge storing a first video game program, and the second data storage medium is a second game cartridge storing a second video game program.

2. The data sharing system of claim 1, wherein the information pertaining to the first video game program is a first event having a status created by the implementation of the first video game program, the status of the first event affecting the implementation of the second video game program by:
  (i) altering the performance of the second video game program;
  (ii) producing a second event having a status; and
  (iii) storing the second event in the memory for retrieval by the first video game program.

3. The data sharing system of claim 1, wherein the information pertaining to the first video game program is a first event having a status created by the implementation of the first video game program, the status of the first event affecting the implementation of the second video game program by:
  (i) altering the performance of the second video game program;
  (ii) producing a second event having a status; and
  (iii) storing the second event in the memory for retrieval by a third video game program.

4. The data sharing system of claim 2, wherein the first video game program implemented by the processor:
  (i) retrieves the status of the second event from the memory; and
  (ii) utilizes the status of the second event to alter the performance of the first video game program.

5. The data sharing system of claim 2, wherein the memory coupled to the processor is a random access memory and wherein the first and second game cartridges are connected to and removed from the processor while the processor is powered on.

6. The data sharing system of claim 2, wherein the memory is a non-volatile random access memory.

7. A method for sharing information between three software programs implementable by a processor, the method comprising:
  connecting a first data storage medium having a first program stored therein to said processor;
  transferring data pertaining to a first program to a memory coupled to the processor;
  connecting a second data storage medium having a second program stored therein to the processor;
  retrieving the data pertaining to the first program from the memory coupled to the processor and then using said data in connection with the second program;
  transferring data pertaining to the second program to the memory coupled to the processor;
  connecting a third data storage medium to the processor, the third data storage medium having a third program stored therein; and
  retrieving the data pertaining to the second program from the memory coupled to the processor and then utilizing said data in connection with the third program,
  wherein the memory coupled to the processor is a random access memory, and
  wherein the first and second data storage media are connected to and removed from the processor while the processor is powered on.

8. A method for sharing information between three software programs implementable by a processor, the method comprising:
  connecting a first data storage medium having a first program stored therein to said processor;
  transferring data pertaining to a first program to a memory coupled to the processor;
  connecting a second data storage medium having a second program stored therein to the processor;
  retrieving the data pertaining to the first program from the memory coupled to the processor and then using said data in connection with the second program;
  transferring data pertaining to the second program to the memory coupled to the processor;
  connecting a third data storage medium to the processor, the third data storage medium having a third program stored therein; and
  retrieving the data pertaining to the second program from the memory coupled to the processor and then utilizing said data in connection with the third program,
  wherein the at least two data storage media are selected from the group consisting of data cartridges, digital video discs, compact discs, and solid state storage devices.

9. A method for sharing information between three software programs implementable by a processor, the method comprising:
  connecting a first data storage medium having a first program stored therein to said processor;
  transferring data pertaining to a first program to a memory coupled to the processor;
  connecting a second data storage medium having a second program stored therein to the processor;
  retrieving the data pertaining to the first program from the memory coupled to the processor and then using said data in connection with the second program;
  transferring data pertaining to the second program to the memory coupled to the processor;
  connecting a third data storage medium to the processor, the third data storage medium having a third program stored therein; and
  retrieving the data pertaining to the second program from the memory coupled to the processor and then utilizing said data in connection with the third program,
  wherein the first data storage medium is a first game cartridge storing a first video game program, and
  wherein the second data storage medium is a second game cartridge storing a second video game program.

* * * * *